United States Patent [19]
Kawamura

[11] 3,796,332
[45] Mar. 12, 1974

[54] CARGO HANDLING EQUIPMENT BY GRIPPING AND SUSPENDING MATERIALS

[76] Inventor: Takashi Kawamura, 63, 1-chome, Tsuboya-cho, Kita-ku,, Osaka-shi, Osaka-fu, Japan

[22] Filed: July 14, 1972

[21] Appl. No.: 271,850

[30] Foreign Application Priority Data
Aug. 23, 1971 Japan.............................. 46-75815

[52] U.S. Cl................. 214/147 G, 294/88, 294/106
[51] Int. Cl............................................ B66c 23/38
[58] Field of Search..... 214/147 G, 147 R; 294/106, 294/88, 115

[56] References Cited
UNITED STATES PATENTS
3,044,819  7/1962  Pierre ................................. 294/88
3,139,302  6/1964  Orloff................................. 294/88

Primary Examiner—Gerald M. Forlenza
Assistant Examiner—George F. Abraham
Attorney, Agent, or Firm—Cullen, Settle, Sloman & Cantor

[57] ABSTRACT

A cargo handling equipment on self-propelling tractors or forklifts provided with extensible arms, holding arms open and closed by a parallelogram link mechanism attached with universal joints to the body, gripping claws at the end of holding arms which are actuated by piston rods extensible by fluid pressure so as to keep said grip claws always horizontally and allow to open and close to each other and further allow said pair of holding arms to move in parallel and to fix the width of grip according to the shape of material whereby effective transportation of cargo can be achieved.

2 Claims, 4 Drawing Figures

CARGO HANDLING EQUIPMENT BY GRIPPING AND SUSPENDING MATERIALS

It is described herein that the present invention wherein on the ends of the foldable and extensible arms affixed to a self-advancing movable chassis like a tractor, forklift and the like being linked with by means of universal joints and the gripping and holding arms being made to be opened and closed by means of a parallelogram mechanism and gripping claws being affixed to said arm ends by means of left and right direction universal joints, the cargo being gripped by the parallel shift thereof, and further by having the holding arms parallelly shifted in the rear and front direction thereof according to the shape of the cargo, the width of the place of gripping thereof being determined so as to have the materials transported effectively and properly in response to the shape and size of the materials.

Conventionally a cargo handling has not been employed according to the shape, size and weight of the cargo in the transport operation of iron materials in either of the steel manufacturing plant or in the carrying out of timbers or iron ores from forests or mines and the like, and the transportation of such materials has been performed by a machine which is capable of individual operation, so that the operation has not been efficient and the work itself might have been such that accompanies danger, and the work has required good experience from the workers in the job.

In view of the fact which has been described above, the cargo handling equipment according to the present invention is such that, on foldable and extensible arms provided on the self-advancing movable chassis are linked by means of holding universal joints opened and closed by a parallelogram mechanism provided with arms, and the cargo being transported by being gripped and suspended by the gripping claws of said arm ends, and therefore the equipment of the present invention has characteristics that the equipment is simple and safe in operation and the work is performed efficiently.

The equipment of the present invention will be more clarified by referring to the description of the practical example of the invention illustrated in the accompanying drawings, and thereby the invention itself will be best understood.

Referring to the accompanying drawings.

Figure 1:
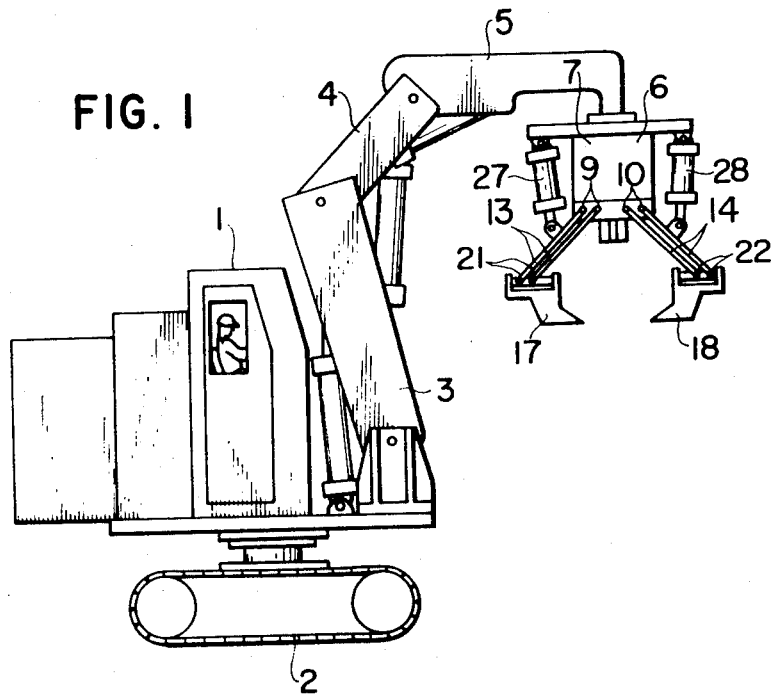
FIG. 1 shows the front view of the whole body provided with the equipment of the present invention with the linkages associated with the central piston being omitted for clarity.
Figure 2:
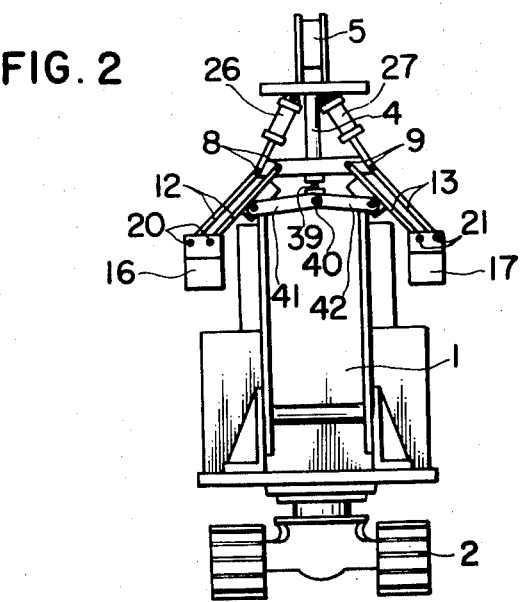
FIG. 2 is a side view thereof.
Figure 3:
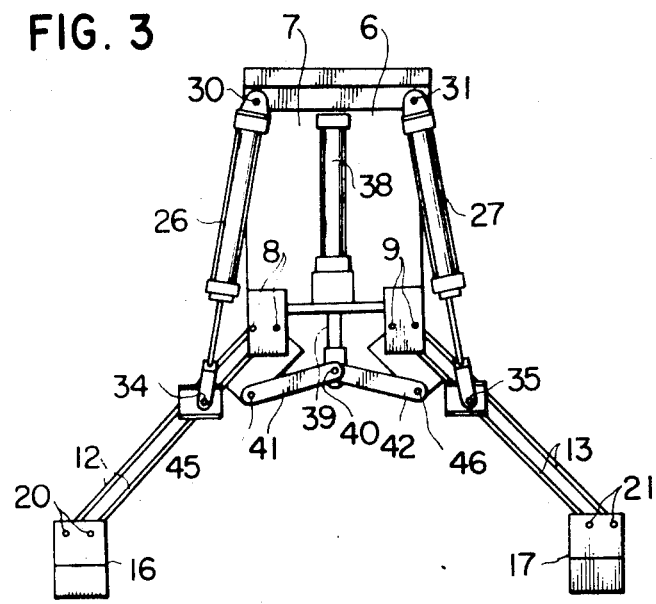
FIG. 3 is a front view of the gripping and suspending cargo handling equipment of materials with the linkages associated with the central piston being omitted for clarity, and FIG. 4 a side view thereof.
Figure 4:
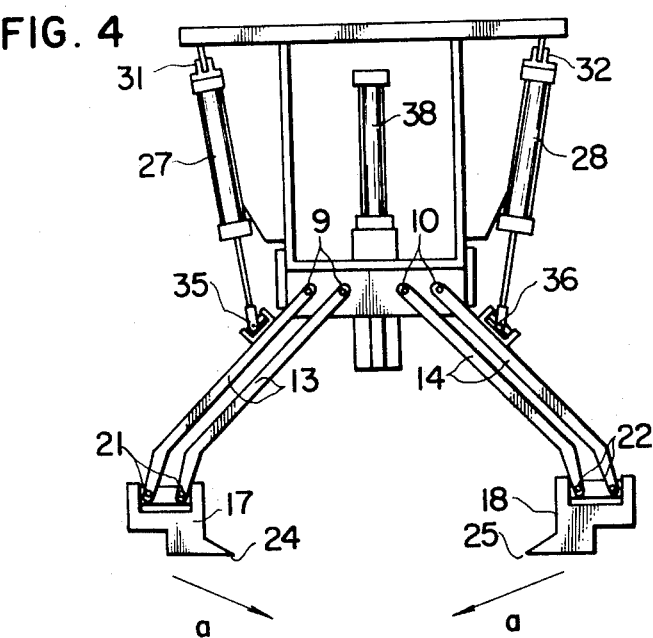

In FIG. 1 1 indicates the main body of moving chassis and it is so made as to be self-advancing through driving belts and a power equipment. To the front basic frame the main body 1 of the moving chassis freely foldable and extensible arms 3, 4 and 5 being affixed, and on the ends of said arms the gripping and suspending means 6, which is the main object of the present invention, is provided. The gripping and suspending equipment 6 as shown in FIGS. 3 and 4, holding arms 12, 13, 14 and 15 — 15 not shown in the drawings — opened and closed by means of a parallelogram link mechanism being linked with the main body 7 through universal joints 8, 9, 10 and 11 — 11 not shown in the drawings and said holding claw ends being respectively linked with gripping claws 16, 17, 18 and 19 — 19 not shown in the drawings — through universal joints 20, 21, 22 and 23 — 23 not shown in the drawings. The front end portion 24 and 25 as shown in the drawings are so shaped as to be able to conveniently pick up and hold the cargo of materials and are so made as to be parallelly shifted against the cargo along with with the opening and closing of said holding arms.

26, 27, 28 and 29 — 29 not shown in the drawings — being cylinders for gripping the cargo and the basic ends 30, 31, 32 and 33 — 33 not shown in the drawings — forming universal joints and fixed to the main body, and the other ends 34, 35, 36 and 37 — 37 not shown in the drawings — forming universal joints and being affixed at predetermined positions to the holding arms 12, 13, 14 and 15 — 15 not shown in the drawings — being opened and closed in the directions of arrows $a$, $a$ through a piston rod advancing and retracting under differential fluid pressure. The gripping claws on the holding arm ends are maintained always in level position by the link mechanism of the parallelogram during closing and opening as gripping and releasing the cargo is performed.

38 is a central cylinder mounted in the center of the body 7. One end of its piston rod 39 is connected with pin 40 to levers 41, 42, 43 and 44, [43, 44 not shown in drawings] and with pins 45, 46, 47, 48 [47, 48 not shown in the drawing] at predetermined points on said holding arms 12, 13, 14 and 15 respectively. With the extension and retraction of said piston rod 39, the holding arms through said levers are simultaneously adjusted to accomodate the width of the material to be gripped.

The holding arms 12, 13, 14 and 15 mounting the gripping claws at the ends respectively thereof comprise the four pieces, each holding thereof being linked with the main body 7. The gripping claws are fixed by means of universal joints. The closing and opening in the directions left and right and rear and front of those holding arms are so made as to work by the fluid pressure cylinders. Each is affixed to the predetermined position of each holding arm, and besides, since so made as to be able to determine its position freely and independently being worked by the fluid pressure cylinders attached to the predetermined position of each gripping arm the spacing thereof can be determined freely and independently according to the size, weight and shape of the cargo, and also since the gripping claws are shifted in parallel by the parallelogram link mechanism, it is effective in the point that the interposedly holding and carrying of the cargo are performed effectively and properly and therefore the equipment of the present invention is convenient in employing the same in the site of cargo handling of various kinds of materials.

What we claim is:

1. In a cargo handling device for gripping and suspending materials, with foldable and extensible arms mounted on a self-advancing movable chassis, a body mounted on the outer end of one of said arms;

four gripping and holding arms affixed by means of universal joints at their one ends respectively to said body;

gripping claws affixed by universal joints at the other ends of said gripping and holding arms;

four fluid pressure cylinders pivotally suspended from said body with the free end of each piston rod pivotally connected at a predetermined point to a respective gripping and holding arms whereby on application of differential fluid pressure to said cylinders, said claws will move simultaneously inward and outward to grip and release said mateial;

a central cylinder depending from said body inwardly of said four sets of gripping and holding arms including a reciprocal piston rod;

and a plurality of links pivotally connected at their inner ends to said latter piston rod and extending at right angles thereto, and at their outer ends pivotally connected respectively to each of said sets of gripping and holding arms intermediate their ends; whereby application of differential fluid pressure to said central cylinder will move the claws laterally simultaneously.

2. In the cargo handling device of claim 1, each of said gripping and holding arms consisting of a pair of parallel bars pivotally connected at one end to said body and at the other end to a respective claw, to define each of said gripping and holding arms as a parallelogram, whereby the claws during all movements will remain in a horizontal position.

* * * * *